United States Patent [19]

Heath

[11] Patent Number: 4,693,513

[45] Date of Patent: Sep. 15, 1987

[54] THIGH SUPPORT FOR VEHICLE SEAT

[75] Inventor: Peter W. Heath, Billericay, England

[73] Assignee: General Motors Corporation, Detroit, Mich.

[21] Appl. No.: 6,775

[22] Filed: Jan. 27, 1987

[51] Int. Cl.⁴ .................................................. A47C 3/00
[52] U.S. Cl. ...................................... 297/284; 297/433; 74/411.5
[58] Field of Search ........................ 297/284, 362, 433; 74/411.5

[56] References Cited

U.S. PATENT DOCUMENTS

| 262,311 | 8/1882 | Ortlepp | 297/433 X |
| 453,237 | 6/1891 | Goodwin | 297/433 X |
| 3,566,709 | 3/1971 | Metcalf | 74/411.5 |
| 4,583,781 | 4/1986 | Hatsutta et al. | 297/284 |
| 4,589,696 | 5/1986 | Kanai et al. | 297/284 |

Primary Examiner—Francis K. Zugel
Attorney, Agent, or Firm—Ernest E. Helms

[57] ABSTRACT

The present invention provides an adjustable thigh support pivotal joint apparatus and method of the utilization of the same for vehicle seats. In a preferred embodiment of the present invention, a first sector gear is fixably attached to a femur portion of the vehicle seat and is in constant mesh with a second planet gear rotatively attached with the thigh support. A third gear has a locking position in mesh with both the first and second gears and a nonlocking position in mesh with no more than one of the other gears allowing the thigh support to be adjusted.

8 Claims, 6 Drawing Figures

THIGH SUPPORT FOR VEHICLE SEAT

FIELD OF THE INVENTION

The field of the present invention is that of vehicle seats. More particularly, the field of the present invention is that of vehicle seats with adjustable thigh supports.

DISCLOSURE STATEMENT

To increase the comfort of a vehicle seat occupant and to lessen fatigue, it is desirable to provide a thigh support whose inclination with respect to the femur member of the seat may be adjusted. An example of such an adjustable thigh support (sometimes referred to as leg support) is shown and described in co-pending commonly assigned U.S. patent application "Apparatus and Method of Vehicle Seat with an Adjustable Leg Rest", Serial No. 869,342 filed June 2, 1986. The present invention provides a vehicle seat adjustable thigh support joint having an incremental adjustment mechanism which is highly durable yet relatively easy to operate. The present invention will typically be used in vehicle seats having manually adjustable thigh supports.

SUMMARY OF THE INVENTION

The present invention provides a joint for a vehicle seat having an adjustable thigh support wherein one of the two link members of the joint has a fixably connected first gear. Rotatively mounted to the other link member and meshed with the first gear is a second gear. Connected with one of the links of the joint is a lever which has a rotatively mounted thereto a third gear. The third gear has a first selective position in mesh with both the first and second gears to lock the position of the thigh support. The third gear also has a second selective position meshed with not more than one other gear to allow the adjustment of the thigh support.

It is an object of the present invention to provide a vehicle seat adjustable thigh support joint. It is another object of the present invention to provide a method adjusting the joint of a vehicle seat with an adjustable thigh support.

It is still another object of the present invention to provide a vehicle seat adjustable thigh support pivotal joint in combination including a first link providing a femur support, a second link pivotally attached with the first link providing a thigh support, a first sector gear fixably attached to the first link, a second gear meshed with the first gear and rotatively attached to the second link, and a third gear rotatively attached to a lever, the lever being pivotally attached to the second link and wherein the rotational axis of the second gear is coaxial with the pivotal axis of the lever and the third gear is in constant mesh with the second gear, and whereby the third gear in a biased first selective position is in mesh with the first gear to lock the position of the thigh support, and whereby the third gear in a second selective position is not in mesh with the first gear to allow adjustment of the thigh support.

It is still yet another object of the present invention to provide a method of adjusting the thigh support pivotal joint of a vehicle seat having first and second links including pivotally attaching the second link with the first link, fixably attaching to a first link a first gear, meshing with the first gear a second gear which is rotatively attached to the second link, and rotatively attaching a third gear to a lever which is in turn attached to one of the links whereby the third gear is brought into a first selective position to mesh with the first and second gears to lock the position of the thigh support and wherein the third gear is brought into a second selective position allowing adjustment of the thigh support pivotal joint.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
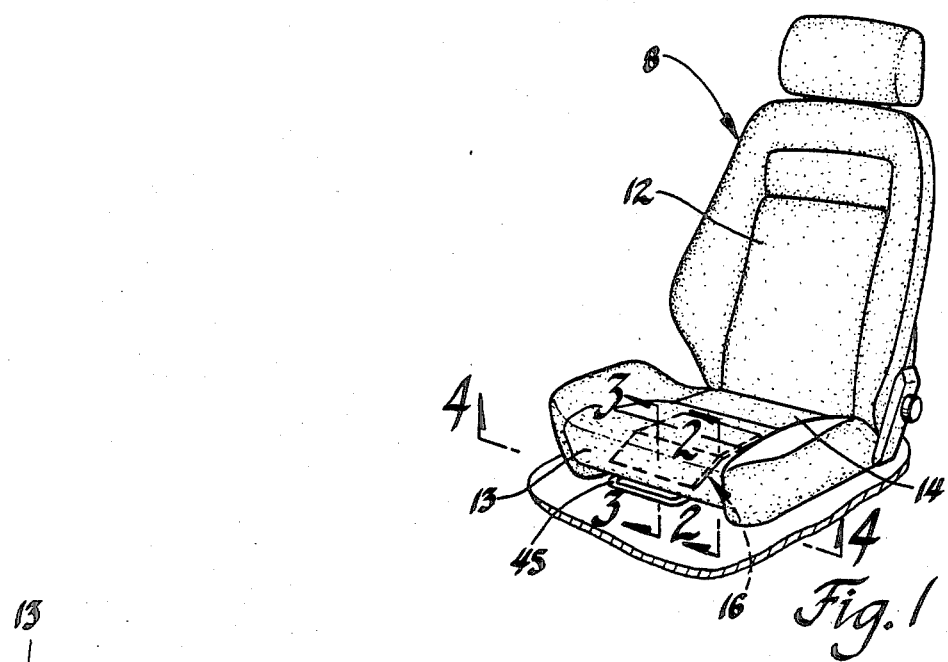
FIG. 1 is a perspective view of a vehicle seat having an adjustable thigh support utilizing a preferred embodiment present invention.
Figure 2:
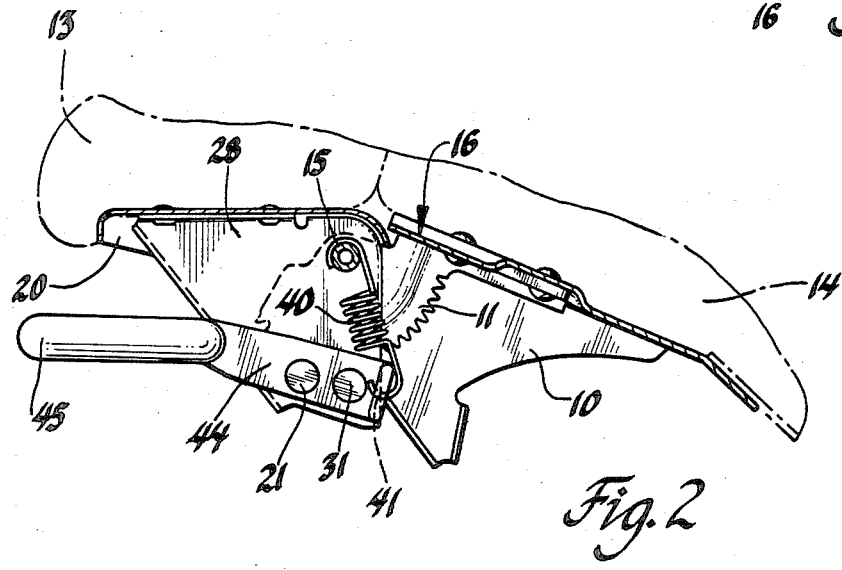
FIGS. 2 and 3 are sectional views take along lines 2—2 and 3—3 of FIG. 1.
Figure 3:
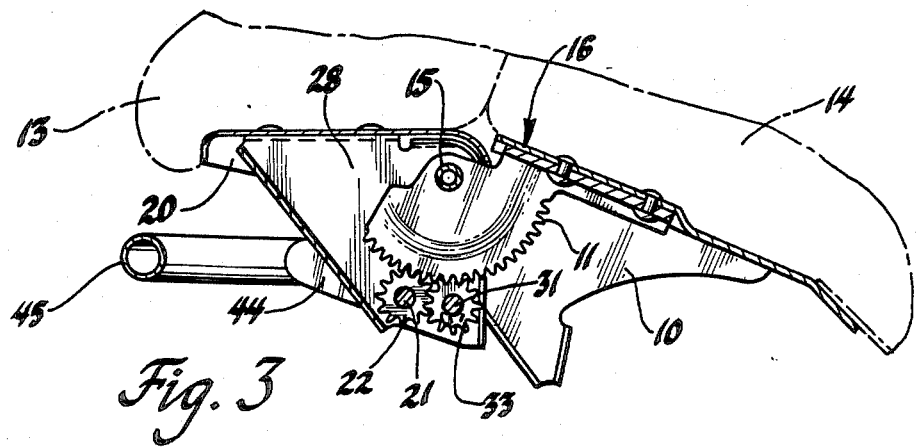
Figure 4:
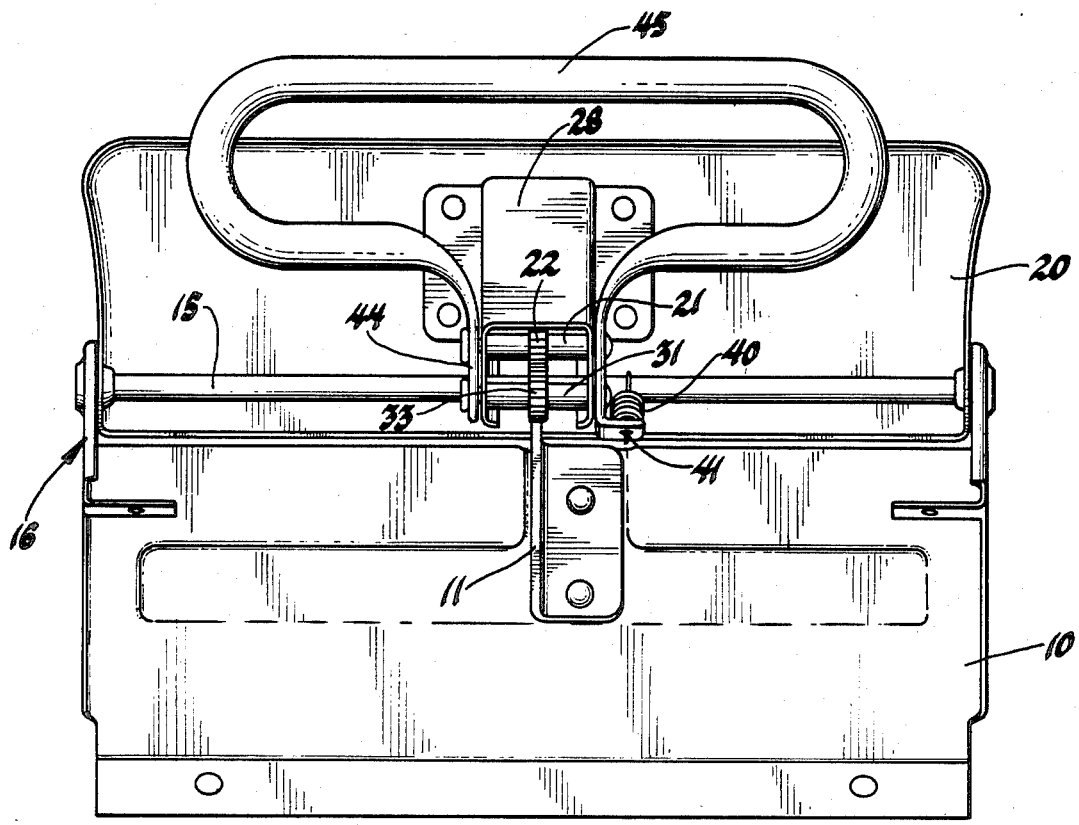
FIG. 4 is a bottom elevational view taken along lines 4—4 of FIG. 1.
Figure 5:
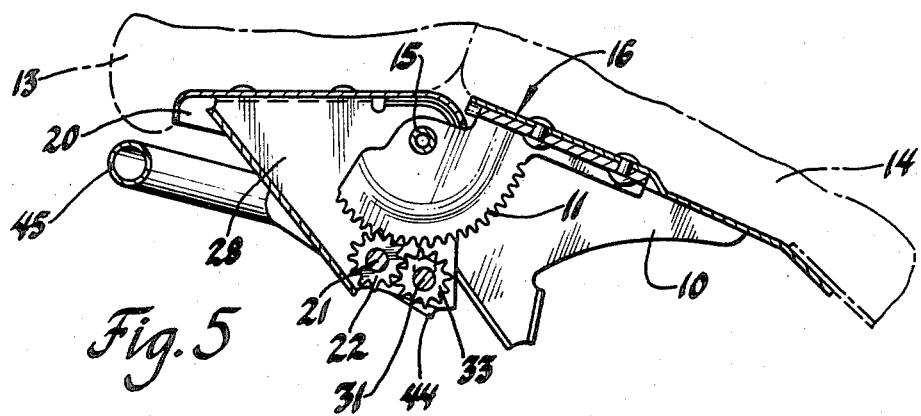
FIGS. 5 and 6 illustrate adjustment of the joint of the present invention from a position illustrated in FIG. 3 to a lowered position.

Referring to FIG. 1, the vehicle seat 8 has a seat back 12 joined with a seat femur member or seat cushion 14. The seat cushion 14 is provided with an adjustable thigh support 13 which includes a pivotal joint 16 covered by cushion material. A handle 45 is provided to adjust pivotal joint 16.

Referring to FIGS. 2, 3, 4, 5 and 6, the adjustable thigh support of the present invention has a first link 10 and a pivotally attached second link 20. The first link 10 will typically be integral or fixably connected with seat cushion 14 (femur support). The second link 20 is most often utilized as the extended portion of the seat (referred to as the thigh support). In the preferred embodiment, a first gear 11 is fixably attached to the first link and is commonly referred to as the sun or sector gear.

Fixably attached to the second link 20 is a gear mounting bracket 28. The mounting bracket has a second gear 22 rotatively attached via a second gear shaft 21. The second gear 22 is in a constant meshed relationship with the first gear 11. The pitch diameter of the second gear 22 is usually less than one-fourth of the pitch diameter of the first gear 11.

A third gear 33 is mounted on a third gear shaft 31 which is in turn rotatively attached with a lever 44. The lever 44 is pivotally attached to one of the two links (second link 20). Pivotal movement of lever 44 about shaft 21 allows the third gear 33 to be translated from a first selective position meshing with both the first gear 11 and second gear 22 (locking position) to a second (nonlocking) selective position wherein the third gear 33 meshes with no more than one of the other two gears. In the embodiment of FIGS. 3-6, the pivotal axis of the lever 44 is coaxial with the rotational axis of the second gear 22. Therefore, the third gear 33 is a planetary gear of the second gear 22.

Figure 6:
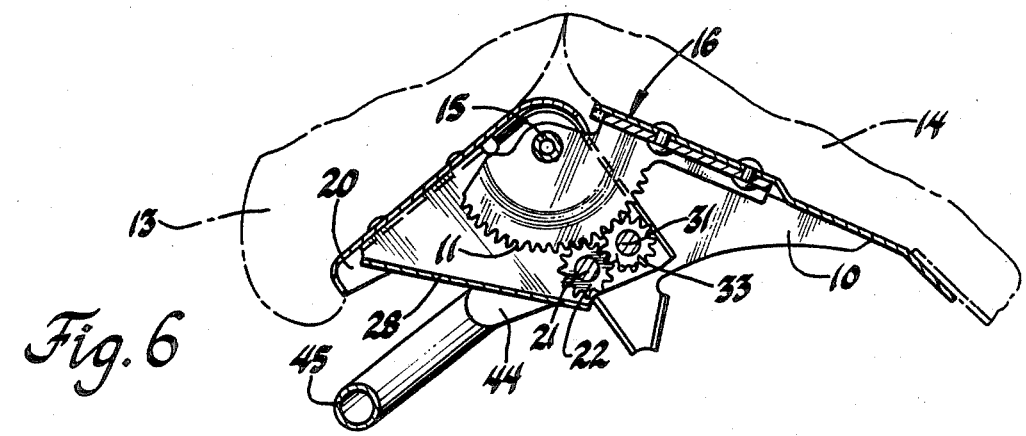

To aid in the pivotal connection of the first link 10 to the second link 20, there is provided a support shaft 15. Connected with the support shaft 15 and fitting within a notch 41 (FIG. 4) of the lever 44 is a biasing spring 40. The biasing spring urges the lever 44 to a position wherein the third gear 33 will mesh with the second gear 22 and the first gear 11. In the above position, relative movement between the gears is prevented; therefore, the pivotal joint 16 is locked. When the third gear 33 is moved via the lever 44 (FIG. 5) which is in turn connected with the handle 45, the third gear 33 will pivot on top of the second gear 22 and come out of engagement with the first gear 11. After the third gear 33 comes out of mesh with the first gear 11, relative movement will be allowed between the first link 10 and second link 20 and the thigh support 13 can be adjusted to the occupant's desire (FIG. 6). Upon the release of the handle 45, the spring 40 will return the third gear 33 into the first selected position meshing with the first gear 11 and the second gear 22. The position of the thigh support 13 is now locked.

The present invention provides a method of adjusting the thigh support pivotal joint 16 of a vehicle seat 8 having a first link 10 and a second link 20 including the steps of:

1. Pivotally attaching a first link 10 to a second link 20;
2. Fixably attaching to the first link 10 to a first gear 11;
3. Meshing with the first gear 11 a second gear 22 which is rotatively attached to the second link 20;
4. Rotatively attaching a third gear 33 to a lever 44 which is in turn attached to one of the links whereby the third gear 33 is brought into a first selected position to mesh with the first gear 11 and second gear 22 to lock the position of the thigh support pivotal joint 16 and whereby the third gear 33 is brought into a second selective position allowing adjustment of the thigh support pivotal joint 16.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat adjustable thigh support pivotal joint, said joint in combination comprising:
   a first link providing a first support;
   a second link pivotally attached with said first link providing a second support;
   a first gear fixably attached to said first link;
   a second gear meshed with said first gear and rotatively attached to said second link; and
   a third gear rotatively attached to a lever, said lever being attached to one of said links whereby said third gear has a first selective position meshed with said first and second gears to lock the position of said thigh support and said third gear having a second selective position meshed with not more than one of said first and second gears to allow adjustment of said thigh support.

2. A thigh support pivotal joint as described in claim 1 wherein said first link supports a femur portion of said joint and said second link supports a thigh portion of said joint.

3. A vehicle seat adjustable thigh support pivotal joint as described in claim 1 wherein said first gear has a pitch diameter at least four times larger than the pitch diameter of said second gear.

4. A vehicle seat adjustable thigh support pivotal joint as described in claim 1 wherein said lever is attached to said second link along a pivotal axis and wherein said second gear has a rotational axis coaxial with said pivotal axis of said lever.

5. A vehicle seat adjustable thigh support pivotal joint as described in claim 1 wherein said third gear is in mesh with said second gear in said first and second selective positions.

6. A vehicle seat adjustable thigh support pivotal joint as described in claim 1 wherein said third gear in said first position is biased into engagement with said first gear.

7. A vehicle seat adjustable thigh support pivotal joint, said joint in combination comprising:
   a first link providing a femur support;
   a second link pivotally attached with said first link providing a thigh support;
   a first sector gear fixably attached to said first link;
   a second gear meshed with said first gear rotatively attached to said second link along a rotational axis; and
   a third gear rotatively attached to a lever, said lever being attached to said second link along a pivotal axis and wherein said rotational axis of said second gear is coaxial with said pivotal axis of said lever and said third gear is in constant mesh with said second gear, whereby said third gear in a biased first selective position is in mesh with said first gear to lock the position of said thigh support, and said third gear in a second selective position is not in mesh with said first gear to allow adjustment of said thigh support.

8. A method of adjusting the thigh support pivotal joint of a vehicle seat having first and second links, said method comprising in combination:
   pivotally attaching said second link with said first link;
   fixably attaching to said first link a first gear;
   meshing with said first gear a second gear which is rotatively attached to said second link; and
   rotatively attaching a third gear to a lever which is in turn attached to one of said links, whereby said third gear is brought into a first selective position to mesh with said first and second gears to lock the position of said thigh support and whereby said third gear is brought into a second selective position allowing adjustment of said thigh support.

* * * * *